(12) United States Patent
Umeki et al.

(10) Patent No.: US 9,889,726 B2
(45) Date of Patent: Feb. 13, 2018

(54) SHADE APPARATUS

(71) Applicants: AISIN SEIKI KABUSHIKI KAISHA, Kariya-shi, Aichi-ken (JP); MACAUTO INDUSTRIAL CO., LTD., Tainan (TW)

(72) Inventors: Takayuki Umeki, Chiryu (JP); Yuki Kobayashi, Toyota (JP); Yoshitaka Nakamura, Nagoya (JP); Paul Lin, Tainan (TW)

(73) Assignees: Aisin Seiki Kabushiki Kaisha, Kariya-shi, Aichi-ken (JP); Macauto Industrial Co., Ltd., Yongkang District, Tainan (TW)

( * ) Notice: Subject to any disclaimer, the term of this patent is extended or adjusted under 35 U.S.C. 154(b) by 0 days.

(21) Appl. No.: 15/138,696

(22) Filed: Apr. 26, 2016

(65) Prior Publication Data

US 2017/0087966 A1    Mar. 30, 2017

(30) Foreign Application Priority Data

Sep. 24, 2015  (JP) ................. 2015-187373

(51) Int. Cl.
*E06B 9/58* (2006.01)
*B60J 1/20* (2006.01)
*B60J 7/00* (2006.01)
*E06B 9/42* (2006.01)

(52) U.S. Cl.
CPC ............ *B60J 1/2052* (2013.01); *B60J 1/205* (2013.01); *B60J 1/2041* (2013.01); *B60J 1/2063* (2013.01); *B60J 7/0015* (2013.01); *B60J 7/0023* (2013.01); *E06B 9/42* (2013.01); *B60J 1/2019* (2013.01)

(58) Field of Classification Search
CPC . E06B 9/58; E06B 9/581; B60J 7/0007; B60J 7/0015; B60J 3/02; B60J 1/2052; B60J 1/205; B60J 1/2063; B60J 7/0023
USPC ...... 160/266–272, 370.22; 296/214, 97.8, 98
See application file for complete search history.

(56) References Cited

U.S. PATENT DOCUMENTS

| 5,209,281 A * | 5/1993 | Kraeutler .................. E06B 9/58 160/264 |
| 5,807,228 A * | 9/1998 | Smithe .................... B65H 45/22 493/179 |
| 6,179,373 B1 * | 1/2001 | Bohm .................... B60J 7/0015 160/273.1 |

(Continued)

FOREIGN PATENT DOCUMENTS

| EP | 2151339 A1 * | 2/2010 | ............ B60J 7/0015 |
| EP | 2447098 A1 * | 5/2012 | ............ B60J 7/0015 |

(Continued)

*Primary Examiner* — Katherine W Mitchell
*Assistant Examiner* — Johnnie A. Shablack
(74) *Attorney, Agent, or Firm* — Finnegan, Henderson, Farabow, Garrett & Dunner, LLP

(57) ABSTRACT

A guide block has a guide projection wall and a guide upper wall. The guide projection wall deviates from an end of a side-held portion in the folded-back state toward the start point of folding-back while moving toward a winding shaft along the longitudinal direction of a guide rail. The guide upper wall deviates in the direction orthogonal to a plane in which a shading sheet is unrolled and toward the shading sheet and abuts on the side-held portion being unfolded while moving toward the winding shaft along the longitudinal direction of the guide rail.

9 Claims, 4 Drawing Sheets

(56) References Cited

U.S. PATENT DOCUMENTS

| | | | | |
|---|---|---|---|---|
| 6,186,587 B1* | 2/2001 | Entenmann | | B60J 1/2041 160/267.1 |
| 7,793,702 B2* | 9/2010 | Biewer | | B60J 7/0007 160/272 |
| 7,798,568 B2* | 9/2010 | Keller | | B60J 7/0015 160/273.1 |
| 7,814,958 B2* | 10/2010 | Hansen | | B60J 7/0015 160/273.1 |
| 7,967,052 B2* | 6/2011 | Lin | | B60J 7/0015 160/273.1 |
| 8,366,187 B2* | 2/2013 | Mihashi | | B60J 7/0435 296/214 |
| 8,419,119 B2* | 4/2013 | Nakamura | | B60J 7/0015 160/265 |
| 8,474,510 B2* | 7/2013 | Nellen | | B60J 7/0015 160/273.1 |
| 8,590,593 B2* | 11/2013 | Kitani | | B60J 7/0015 160/264 |
| 8,770,258 B2* | 7/2014 | Kitani | | B60J 1/2058 160/265 |
| 8,910,698 B2* | 12/2014 | Lin | | B60J 1/2019 160/370.22 |
| 8,997,831 B2* | 4/2015 | Lin | | B60J 7/0015 160/268.1 |
| 9,067,479 B2* | 6/2015 | Yukisada | | B60J 7/0015 |
| 9,108,491 B2* | 8/2015 | Zendath | | B60J 7/0015 |
| 9,205,729 B2* | 12/2015 | Hiramatsu | | B60R 13/0231 |
| 9,222,304 B2* | 12/2015 | Casey | | E06B 9/581 |
| 9,493,984 B2* | 11/2016 | Casey | | E06B 9/581 |
| 2007/0175603 A1* | 8/2007 | Lin | | B60J 7/0015 160/273.1 |
| 2009/0178771 A1* | 7/2009 | Lin | | B60J 7/0015 160/370.22 |
| 2010/0032991 A1* | 2/2010 | Keller | | B60J 7/0015 296/214 |
| 2010/0032992 A1* | 2/2010 | Keller | | B60J 7/0007 296/216.01 |
| 2010/0170645 A1* | 7/2010 | Lin | | B60J 7/0015 160/370 |
| 2011/0227371 A1* | 9/2011 | Nellen | | B60J 7/0015 296/216.04 |
| 2012/0098301 A1* | 4/2012 | Nakamura | | B60J 7/0015 296/219 |
| 2012/0168100 A1* | 7/2012 | Kitani | | B60J 7/0015 160/370.22 |
| 2012/0187725 A1* | 7/2012 | Rockelmann | | B60J 7/0015 296/219 |
| 2016/0114664 A1* | 4/2016 | Yukisada | | B60J 7/0015 296/98 |
| 2016/0130872 A1* | 5/2016 | Munsters | | E06B 9/40 160/309 |
| 2016/0185194 A1* | 6/2016 | Rikkert | | B60J 1/2052 160/368.1 |
| 2016/0221424 A1* | 8/2016 | Van Boxtel | | |
| 2016/0257184 A1* | 9/2016 | Van Boxtel | | |
| 2016/0368353 A1* | 12/2016 | Clephas | | B60J 7/0015 |
| 2017/0008383 A1* | 1/2017 | Ten-Jet-Foei | | E06B 9/581 |

FOREIGN PATENT DOCUMENTS

| | | | | |
|---|---|---|---|---|
| EP | 2151339 B1 * | 3/2014 | | B60J 7/0015 |
| EP | 2987668 A1 * | 2/2016 | | B60J 7/067 |
| EP | 3017985 A1 * | 5/2016 | | E06B 9/40 |
| EP | 3064386 A1 * | 9/2016 | | B60J 7/0015 |
| JP | 2012-158324 | 8/2012 | | |

* cited by examiner

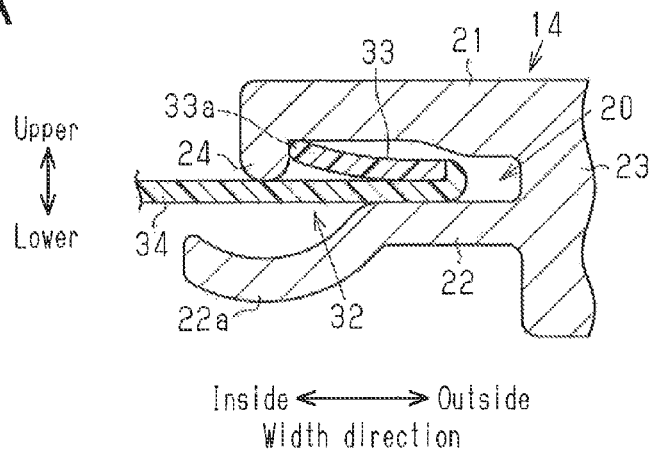
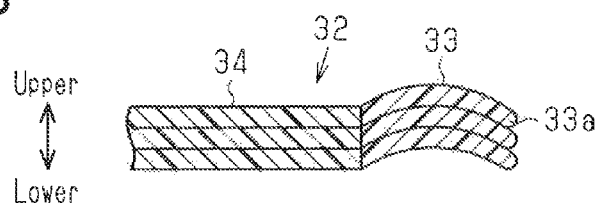
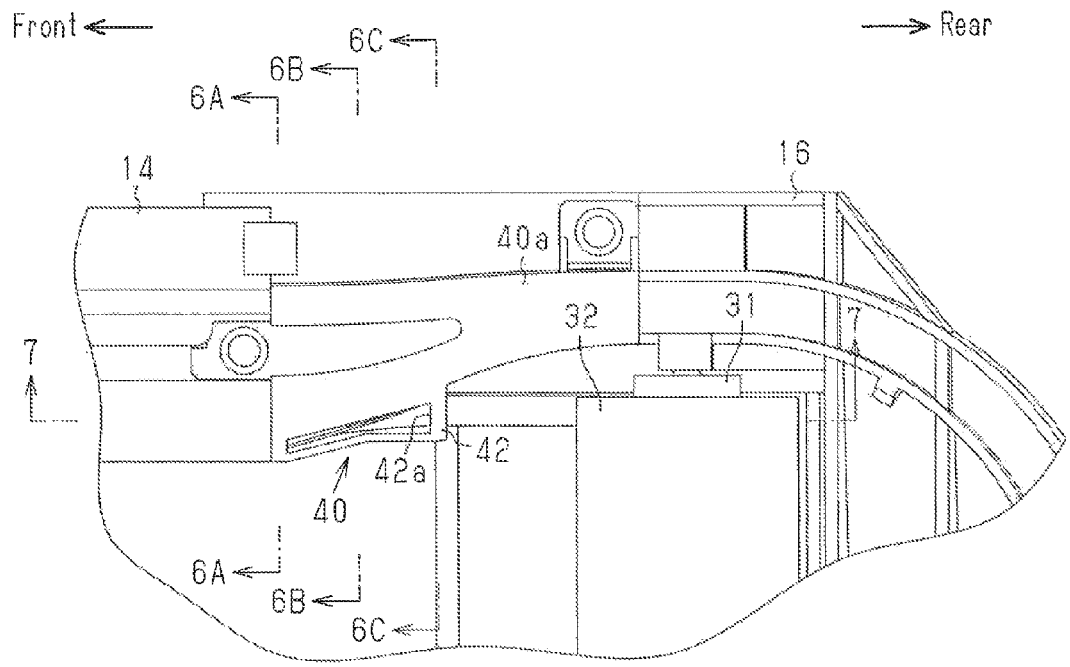

SHADE APPARATUS

BACKGROUND OF THE INVENTION

The present invention relates to a shade apparatus that has a shading sheet wound and retracted into a roll and unwound and unrolled into a sheet.

A shade apparatus described in Japanese Laid-Open Patent Publication No. 2012-158324 has been known. The shade apparatus has a shading sheet, guide rails, and guide blocks. The shade apparatus intercepts light that passes through a light transmission portion of a vehicle by unwinding and unrolling the shading sheet into a sheet, and allows the light to be passed by winding and retracting the shading sheet into a roll. Each guide rail slidably supports each side edge of the shading sheet in the folded back state. In unrolling the shading sheet, the side edge of the shading sheet slides in the folded-back state in a guide of the guide rail. In retracting the shading sheet, the side edge of the shading sheet folded back in the guide rail is wound in the unfolded state. In unrolling the shading sheet, each guide block insertably guides the side edge of the shading sheet into the guide rail while folding-back the side edge of the shading sheet.

In the conventional configuration, in unrolling the shading sheet, the side edge of the shading sheet is inserted into the guide rail while being folded back by the guide block. In retracting the shading sheet, the side edge of the shading sheet folded back in the guide rail is wound by being returned into the freely unfolded state. This is likely to wind the shading sheet into a roll in a state where its side edge is insufficiently unfolded.

SUMMARY OF THE INVENTION

An object or the present invention is to provide a shade apparatus capable of unfolding both side edges folded back in unrolling a shading sheet more reliably when the shading sheet is retracted.

To solve the above problems, a first aspect of the present invention provides a shade apparatus including a pair of guide rails extending in one direction; a winding shaft extending between both ends of the guide rails; a shading sheet connected to the winding shaft, the shading sheet intercepting light that passes through a light transmission portion provided in a vehicle, by being unwound and unrolled into a sheet while, each side edge of the shading sheet in the longitudinal direction of the winding shaft is folded back to slide in each guide rail, and allowing the light to be passed by being wound and retracted into a roll while the side edge of the shading sheet folded back in the guide rail is unfolded; and a guide block disposed at each end of the guide rail near the winding shaft, the guide block having a first guide wall deviating from an end of the side edge of the shading sheet in the folded-back state toward the start point of folding-back while moving toward the winding shaft along the longitudinal direction of the guide rail, and a second guide wall deviating in the direction orthogonal to the unrolled shading sheet and toward the shading sheet and abuttable on the side edge of the shading sheet being unfolded while moving toward the winding shaft along the longitudinal direction of the guide rail.

BRIEF DESCRIPTION OF THE DRAWINGS

FIG. 3A is a cross-sectional view taken along line 3A-3A of FIG. 2;

FIG. 3B is a cross-sectional view taken along line 3B-3B of FIG. 2;

FIG. 4 is an enlarged partial plan view of the shade apparatus near a guide block;

DETAILED DESCRIPTION OF THE PREFERRED EMBODIMENTS

An embodiment of a shade apparatus will be described below. Hereinafter, the front-rear direction of a vehicle is referred to as a "front-rear direction", and the up side and the down side of the vehicle in the height direction are referred to as an "up side" and a "down side", respectively. In addition, the inside of the compartment of the vehicle in the width direction is referred to as "inside", and the outside of the compartment of the vehicle in the width direction is referred to as "outside".

Figure 1:
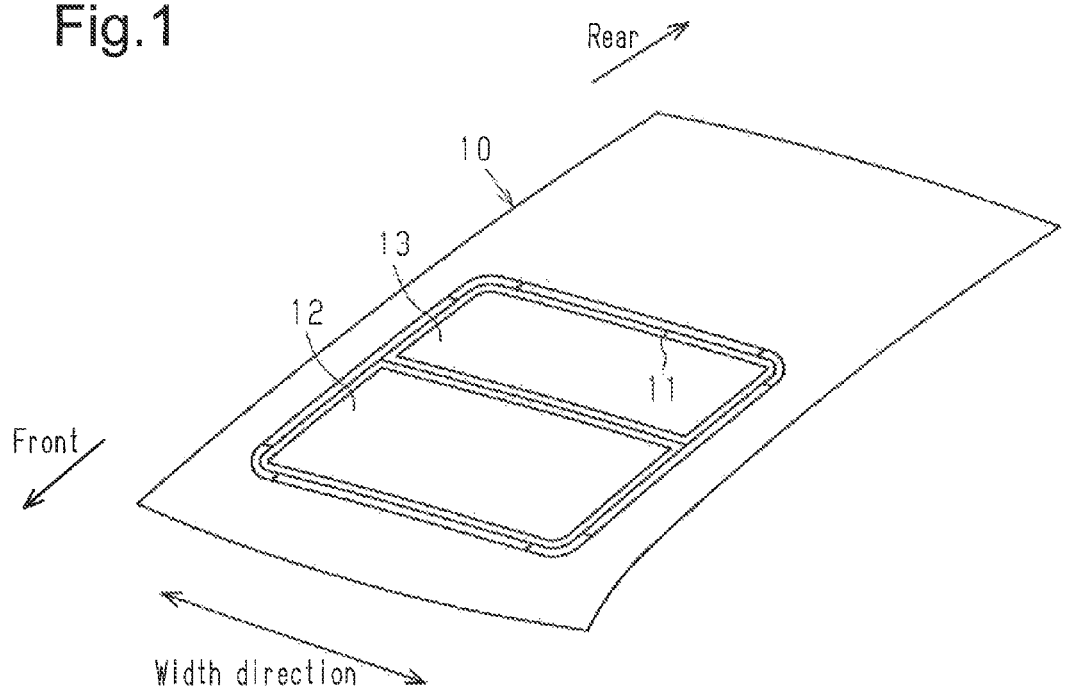
FIG. 1 is a perspective view of a roof to which a shade apparatus according to an embodiment of the present invention is applied.

As illustrated in FIG. 1, a roof 10 of the vehicle, such as an automobile, has an opening 11, a movable panel 12, and a fixed panel 13. The opening 11 is substantially square. The movable panel 12 and the fixed panel 13 are substantially square, and are light transmission portions made of glass or resin. The movable panel 12 is mounted so as to open and close the front portion of the opening 11 by being motor-driven. The fixed panel 13 is mounted so as to always close the rear portion of the opening 11.

Figure 2:
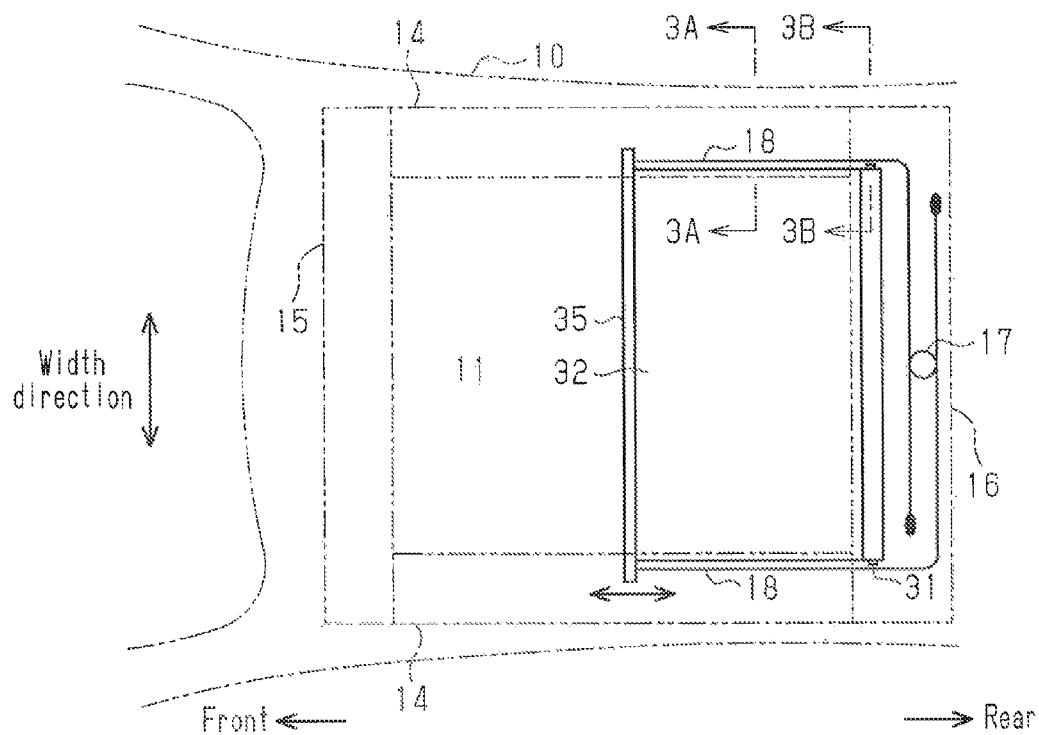
FIG. 2 is a plan view of the shade apparatus.

As illustrated in FIG. 2, the roof 10 has, at both side edges of the opening 11, a pair of guide rails 14. The guide rails 14 are made of an extrusion material, such as an aluminum alloy, and extend in the front-rear direction. That is, the guide rails 14 are parallel to each other. In addition, the roof 10 has, at the front edge of the opening 11, a front housing 15 an also has, at the rear edge of the opening 11, a rear housing 16. The front housing 15 and the rear housing 16 are made of e.g., a resin material, and extend in the width direction of the vehicle. The front ends of the guide rails 14 are connected by the front housing 15, and the rear ends of the guide rails 14 are connected by the rear housing 16. Provided on the rear housing 16 is a substantially tubular winding shaft 31 that extends in the width direction of the vehicle and is rotatably supported about its axis. The winding shaft 31 extends between the rear ends of the guide rails 14.

To the outer periphery of the winding shaft 31, a shading sheet 32 is connected and fixed at its rear end over the entire length thereof in the width direction. With rotation of the winding shaft 31, the shading sheet 32 is wound and unwound. That is, the shading sheet 32 is fixed, at its rear end in the front-rear direction in which the shading sheet 32 is wound and unwound, to the winding shaft 31. The shading sheet 32 is wound and unwound from the lower side of the winding shaft 31. The winding shaft 31 incorporates a biasing member that always biases the shading sheet 32 to the winding side, e.g., a torsion spring.

The shading sheet 32 is fixed at its front end to a rod-shaped garnish 35 extending in the width direction of the vehicle. Both ends of the garnish 35 are slidably supported in the guide rails 14.

When the shading sheet 32 moves forward along the guide rails 14 together with the garnish 35, the winding shaft 31 rotates in one direction to unwind and unroll the shading sheet 32 into a sheet therefrom. Such a closing operation of the shad mg sheet 32 intercepts light that passes through the movable panel 12 or the like. Alternatively, when the shading sheet 32 moves rearward along the guide rails 14 together with the garnish 35, the winding shaft 31 rotates reversely to wind and retract the shading sheet 32 into a roll. Such opening operation of the shading sheet 32 passes the light through the movable panel 12. When the garnish 35 moves in the front-rear direction, both edges of the shading sheet 32 slide in the guide rails 14.

As illustrated in FIG. 3A, each guide rail 14 has, at its inner end, an upper wall 21 and a lower wall 22 arranged in parallel in the height direction, and a vertical wall 23 connecting the outer ends of the upper wall 21 and the lower wall 22. The guide rail 14 also has, at its inner end, a substantially flange-shaped retaining piece 24 extending downward from the inner end of the upper wall 21. The guide rail 14 further has, at its inner end, a guide 20 sectioned by the upper wall 21, the lower wall 22, or the like. The guide 20 has a substantially U-shaped cross section, and is opened inward. The lower wall 22 projects inward from the upper wall 21. The lower wall 22 has, at its inner end, a curved portion 22a bulged downward to the deepest position immediately below the retaining piece 24.

The shading sheet 32 is made of a cloth, such as a nonwoven cloth. At each edge of the shading sheet 32 in the width direction, a substantially band-shaped resin material extending in the front-rear direction is fusion bonded to provide a side-held portion 33 as a side edge. In the guide 20, the side-held portion 33 is folded back so as to make a substantially half turn, and is then overlapped, from above, with the portion of the shading sheet 32 other than the side-held portion 33 (hereinafter, referred to as a "sheet body 34"). The side-held portion 33 has an end 33a abutting on or coming close to the base end of the retaining piece 24. That is, the side-held portion 33 slides in the folded-back state in the guide 20, and is held so as not to come off the guide 20 in such a manner that the end 33a abuts on or comes close to the base end of the retaining piece 24.

As illustrated in FIG. 3a, when exiting from the guide 20 to be wound around the winding shaft 31, the side-held portion 33 is unfolded to the outside of the sheet body 34 to be substantially flat.

As illustrated in FIG. 2, at the intermediate portion of the rear housing 16 in the longitudinal direction, an electric drive source 17, such as an electric motor, having an output gear, is disposed. The electric drive source 17 is coupled to both ends of the garnish 35 via a pair of substantially band-shaped drive belts 18 made of a resin material. The electric drive source 17 moves the garnish 35 in the front-rear direction via the drive belts 18. The drive belts 18 extend rearward from the portions thereof coupled to the garnish 35.

Figure 5A:
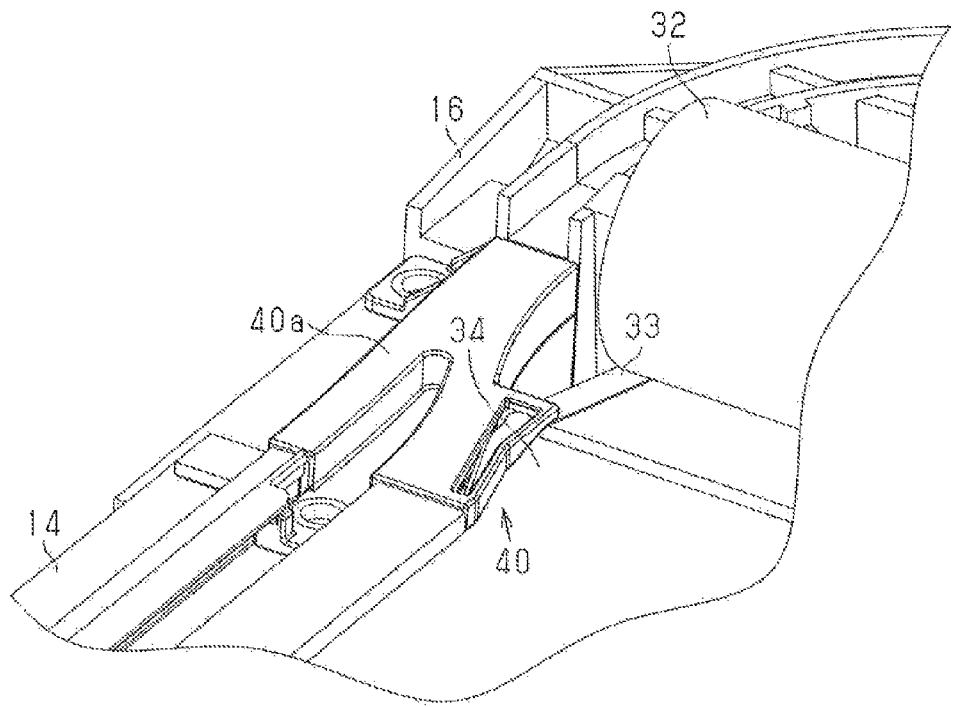
FIGS. 5A and 5B are enlarged partial perspective views of the shade apparatus near the guide block.
Figure 5B:
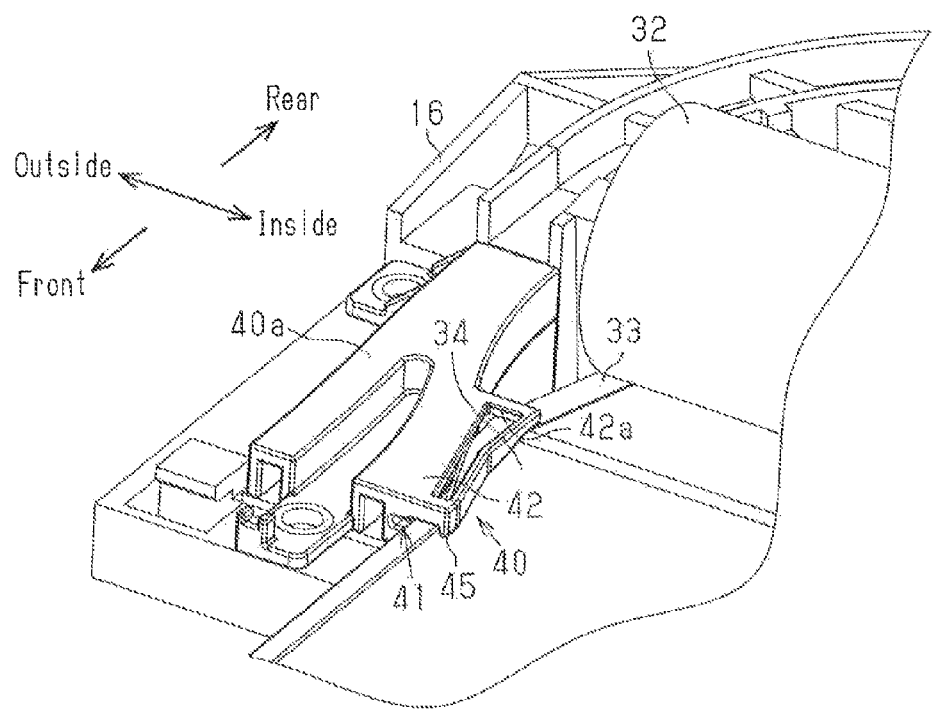

As illustrated in FIGS. 4, 5A, and 5B, at each end of the rear housing 16 in the width direction, that is, at the rear end of each guide rail 14 at which the winding shaft 31 is disposed, a guide block 40 made of e.g., a resin material is placed and fixed. The guide block 40 has, in its outer portion, a belt guide 40a accommodating each drive belt 13.

Figure 6A:
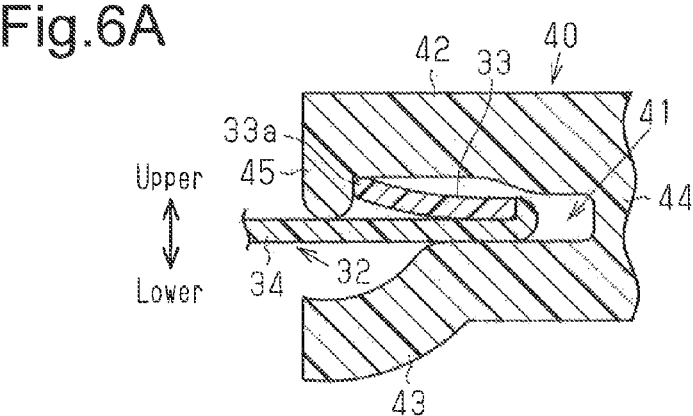
FIG. 6A is a cross-sectional view taken along line 6A-6A of FIG. 4.

The guide block 40 is connected to the rear end of the guide 20 of the guide rail 14. As illustrated in FIG. 6A, the guide block 40 has, at its front end joined to the guide rail 14, a molding guide 41. The molding guide 41 is the inner wall face of the guide block 40 that is substantially flush with and continuous to the inner wall face of the guide 20.

The molding guide 41 has, as second guide walls, a guide upper wall 42 and a guide lower wall 43 arranged in parallel in the height direction, and a guide vertical wall 44 connecting the outer ends of the guide upper wall 42 and the guide lower wall 43. The molding guide 41 also has, as a first guide wall, a substantially flange-shaped guide projection wall 45 extending downward from the inner end of the guide upper wall 42 and abutting on or coming close to the sheet body 34. The inner wall face at the front end of the molding guide 41 includes the guide upper wall 42 and the guide lower wall 43, and has the same shape as the inner wall face of the guide 20. Thus, the side-held portion 33 folded back in the guide 20 is maintained to be folded back even near the front end of the molding guide 41.

Figure 6B:
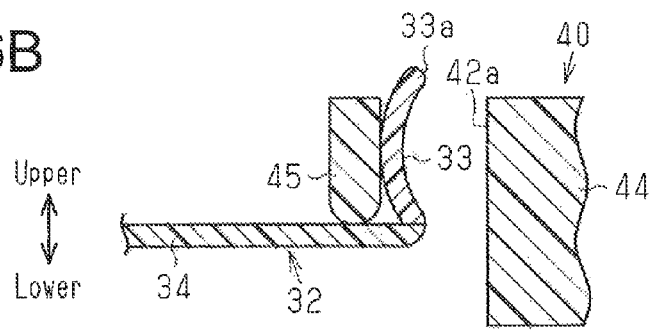
FIG. 6B is a cross-sectional view taken along line 6B-6B of FIG. 4.
Figure 6C:
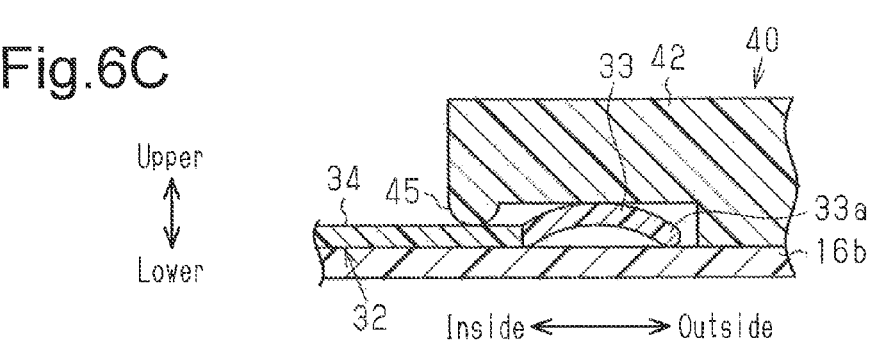
FIG. 6C is a cross-sectional view taken along line 6C-6C of FIG. 4.

As illustrated in FIGS. 6A to 6C, the guide vertical wall 44 deviates from the start point of folding-back of the side-held portion 33 in the folded-back state toward the end 33a of the side-held portion 33 in the unfolded state while moving rearward to the winding shaft 31 along the guide rail 14. At the same time the guide projection wall 45 deviates from the end 33a of the side-held portion 33 in the folded-back state toward the start point, of folding-back while moving rearward.

The guide upper wall 42 deviates in the width direction with deviation of the guide vertical wall 44 and the guide projection wall 45 while moving rearward. As illustrated in FIG. 4, the guide upper wall 42 has, at its intermediate portion in the front-real direction, a through hole 42a opened in the height direction. The guide upper wall 42 deviates upward while moving rearward from the front end of the guide upper wall 42 toward the front end of the through hole 42a. The guide upper wall 42 deviates downward, that is, in the direction orthogonal to the unrolled shading sheet 32 and toward the shading sheet 32 while moving rearward from the rear end of the through hole 42a.

The guide lower wall 43 extends in the front-rear direction to the front end of the through hole 42a, but is not formed rearward from the front end of the through hole 42a.

In the opening operation of the shading sheet 32, the side-held portion 33 folded back in the guide rail 14 reaches the guide block 40, and is then raised upward by the guide projection wall 45 deviating to the outside while moving rearward toward the front end of the through hole 42a. With this, the guide upper wall 42 deviates upward to gradually release the end 33a of the side-held portion 33. Then, the side-held portion 33 reaches the front end of the through hole 42a, and is then raised upward to be substantially erected by the guide projection wall 45 deviating to the outside while moving rearward toward the rear end of the through hole 42a. At the same time, the end 33a of the side-held portion 33 is released in the through hole 42a. Thereafter, the side-held portion 33 reaches the rear end of the through hole 42a, and is then unfolded about the start point of folding-back while being tilted downward by the guide upper wall 42 deviating downward while moving rearward. With this, the guide vertical wall 44 deviates to the outside to release the end 33a of the side-held portion 33. Thus, the shading sheet 32 is wound around the winding shaft 31 in a state where the side-held portion 33 is unfolded about the start point of folding-back.

In the closing operation of the shading sheet 32, the side-held portion 33 in the unfolded state wound around the winding shaft 31 reaches the guide block 40, and is then raised upward by the guide vertical wall 44 deviating to the inside while moving forward toward the rear end of the through hole 42a. With this, the guide upper wall 42 deviates upward to release the end 33a of the side-held portion 33. Then, the side-held portion 33 reaches the rear end of the through hole 42a, and is then raised upward to be substantially erected by the guide projection wall 45 deviating to the inside while moving forward toward the front end of the through hole 42a. At the same time, the end 33a of the side-held portion 33 is released in the through hole 42a. Thereafter, the side-held portion 33 reaches the front end of the through hole 42a, and is then folded back while being tilted downward by the guide upper wall 42 deviating downward while moving forward. With this, the guide projection wall 45 deviates to the Inside to release the end 33a of the side-held portion 33.

Figure 7:
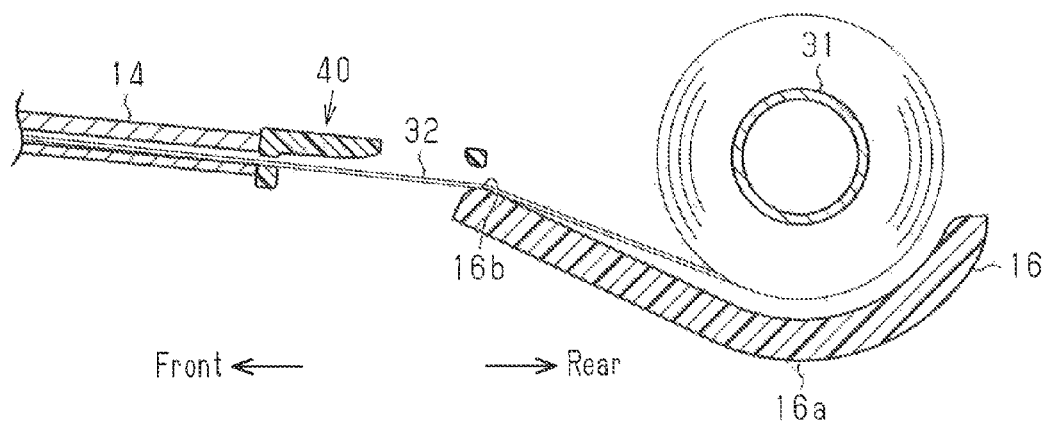
FIG. 7 is a cross-sectional view taken along line 7-7 of FIG. 4.

As illustrated in FIG. 7, the rear housing 16 has a cover 16a having a substantially arc cross section bulged downward to the deepest position immediately below the winding shaft 31. Provided at the front end of the cover 16a is a holding portion 16b serving as a holding member and having a substantially V-shaped cross section with its top located at the rear end of the guide block 40. The holding portion 16b is provided at the front end of the cover 16a so that its to projects upward. The holding portion 16b comes into contact with or comes close to the shading sheet 32 from below. That is, the holding portion 16b comes into contact with or comes close to the unrolled shading sheet 32 from the opposite side of each guide upper wall 42 in the direction orthogonal to the shading sheet 32. The holding portion 16b extends in the width direction over the entire length between both guide blocks 40.

The holding portion 16b functions as a guide frame that directs the moving direction of the shading sheet 32 unwound from the winding shaft 31 to the longitudinal direction of each guide rail 14, and guides each side-held portion 33 into the corresponding guide block 40. In retracting the shading sheet 32, the side-held portion 33 in the unfolded state, which is passed from the guide block 40, abuts on the holding portion 16b so as to be wound around the winding shaft 31. This inhibits the side-held portion 33 from moving downward together with the sheet body 34.

The function of this embodiment will now be described.

In retracting the shading sheet 32, each side-held portion 33 folded back in each guide rail 14 reaches each guide block 40. At time, the side-held portion 33 is gradually raised upward by each guide projection wall 45 deviating toward the start point of folding-back of the side-held portion 33 while coming close to the winding shaft 31 along the guide rail 14. At the same time, the side-held portion 33 being unfolded abuts on each guide upper wall 42, and is then smoothly unfolded about the start point of folding-back. Thus, both side-held portions 33 folded back in unrolling the shading sheet 32 can be unfolded more reliably when the shading sheet 32 is retracted.

According to this embodiment, the following effects can be obtained.

(1) Both side-held portions 33 folded back in unrolling the shading sheet 32 can be unfolded more reliably when the shading sheet 32 is retracted. For instance, even when the side-held portions 33 become hard in high-temperature or other conditions, the shading sheet 32 can be unrolled more reliably. It is also possible to reduce the possibility that the side-held portions 33 in the folded-back state are wound around the winding shaft 31.

Further, in retracting the shading sheet 32, each side-held portion 33 folded back in each guide rail 14 can be unfolded by being guided and assisted by each guide block 40. This configuration can reduce the distance between the rear end of the guide rail 14 and the winding shaft 31, that is, the dimension of the guide block 40 in the front-rear direction, and can increase the width of the opening 11 in the front-rear direction accordingly, as compared with the conventional example in which each side edge of the shading sheet is freely unfolded.

(2) Disclosed below the shading sheet 32 is the holding portion 16b that comes into contact with or comes close to the shading sheet 32. Sometimes, each side-held portion 33 abuts on each guide upper wall 42 to deviate downward, that is, in the direction orthogonal to the unrolled shading sheet 32. In this point, with the above configuration, the holding portion 16b comes into contact with the shading sheet 32 to inhibit the side-held portion 33 from deviating downward. Thus, in retracting the shading she 32, it is possible to reduce the possibility that the side-held portion 33 is separated from the guide upper wall 42 and cannot be sufficiently unfolded.

(3) The holding portion 16b extends over the entire length between both guide blocks 40 below the shading sheet 32. With this, the holding portion 16b comes into contact with the shading sheet 32 over the entire length between the guide blocks 40 to inhibit downward slack of the shading sheet 32 due to its own weight. The posture of each side-held portion 33 can thus be more stable. This can unfold both side-held portions 33 more reliably when the shading sheet 32 is retracted.

(4) The holding portion 16b functions as the guide frame that directs the moving direction of the shading sheet 32 unwound from the winding shaft 31 to the longitudinal direction of each guide rail 14, and guides each side-held portion 33 into the corresponding guide block 40. This can reduce the number of components.

(5) Each guide upper wall 42 has the through hole 42a that releases the end 33a of each side-held portion 33 raised from the folded-hack state by each guide projection wall 45. It is thus possible to reduce the amount of material consumption required for molding each guide block 40. In addition, the guide upper wall 42 having the through hole 42a is not required to deviate upward to the height at which the end 33a of the side-held portion 33 raised from the folded-back state is released. This can reduce the height dimension of the guide block 40.

(6) The shading sheet 32 is wound around the winding shaft 31 in a state where each side-held portion 33 is unfolded. The diameter around the winding shaft 31, that is, the roll diameter of the winding shaft 31, can thus be smaller.

(7) Each guide block 40 serves as the guiding component that folds back each side-held portion 33 in unrolling the shading sheet 32, and as the guiding component that unfolds the side-held portion 33 in retracting the shading sheet 32. This can reduce the number of components.

(8) The holding portion 16b has a substantially V-shaped cross section that projects upward. This allows the shading sheet 32 to come into linear contact with the holding portion 16b. It is thus possible to reduce the sliding resistance of the shading sheet 32 being wound or unwound.

The above embodiment may be changed as follows.

The cover 16a and the holding portion 16b of the rear housing 16, which are molded of a resin material, may be molded of stainless steel or the like.

The holding portion 16b may have a substantially are cross section that projects upward.

The holding portion 16b, which is part of the rear housing 16, may be an independent exclusive component.

The holding member may extend over substantially the entire length of the guide block 40 in the front-rear direction so as to include the rear end of the guide block 40, or may extend to the range without the guide lower wall 43 so as to include the rear end of the guide block 40.

The lower wall 22 may be eliminated over substantially the entire length of the guide block 40 in the front-rear direction. In this case, the moldability of the guide block 40 can be improved. However, at least near the rear end of the guide block 40, the holding member holding the shading sheet 32 is preferably provided.

When the guide upper wall 42 is formed so as to release the end 33a even when the side-held portion 33 is raised upward to be substantially erected in retracting or unrolling the shading sheet 32, the through hole 42a may be eliminated.

The holding portion 16b may be used as an exclusive holding member that does not function as the guide frame. In this case, a pair of holding members may be provided according to the ranges of both guide blocks 40.

The holding portion 16b may be eliminated.

The guide projection wall 45 may deviate to the start point of folding-back at the intermediate portion of the guide upper wall 42 in the front-rear direction at which the side-held portion 33 in the folded-back state is substantially erected. In this case, the guide projection wall 45 may straightly extend rearward from the intermediate portion of the guide upper wall 42 in the front-rear direction, and may deviate to the outside so as to come close to the end 33a of the side-held portion 33 in the unfolded state while moving rearward.

The guide block 40 may be a component used only to guide unfolding of the side-held portion 33 in retracting the shading sheet 32. That is, in unrolling the shading sheet 32, the guide block 40 does not necessarily guide and assist folding-back of the side holding portion 33 in the unfolded state wound around the winding shaft 31 and insertion of the side-held portion 33 into the guide rail 14. Specifically, the guide vertical wall 44 may extend straightly in the front-rear direction, or may be eliminated. In this case, an appropriate guide member that guides and assists folding-back of the side-held portion 33 is preferably added.

The resin for forming the side-held portion 33 is preferably fluororesin with a low coefficient of friction.

In place of the side-held portion 33, the material of the shading sheet 32 may be folded back at each end thereof in the width direction.

The garnish 35 and the shading sheet 32 may be manually moved in the front-rear direction.

The winding shaft 31 may be provided at the front edge of the opening 11 to unwind the shading sheet 32 rearward from the winding shaft 31.

The shade apparatus may allow and intercept passing of light through the light transmission portion, such as a front glass, a side glass, or a rear glass.

The shade apparatus is employed for a sunroof having, as the light transmission portions, the movable panel 12 and the fixed panel 13 provided in the opening 11 of the roof 10. The shade apparatus may be employed for a sunroof having, as the light transmission portion, the movable panel or the fixed panel provided in the opening 11 of the roof 10. Alternatively, the entire roof may be made of a resin material, and part thereof may be the light transmission portion.

The "shading sheet", not only intercepts light completely, but also changes the transmissivity of light.

The invention claimed is:

1. A shade apparatus for a light transmission portion provided in a vehicle, comprising:
    a pair of guide rails extending in a longitudinal direction, wherein each guide rail has a proximal end and a distal end;
    a winding shaft extending between the distal ends of the guide rails;
    a shading sheet connected to the winding shaft, wherein the shading sheet is configured to intercept light that passes through the light transmission portion when the shading sheet has been unwound and unrolled, wherein when the shading sheet is being unrolled, each side edge of the shading sheet extending in the longitudinal direction is folded back to slide in a respective one of the guide rails, and wherein the shading sheet is further configured to allow the light to be passed when the shading sheet has been wound and retracted into a roll, wherein when the shading sheet is being wound and retracted into the roll, the folded side edges of the shading sheet are unfolded; and
    a pair of guide blocks, each of the guide blocks being disposed at the distal end of a respective one of the guide rails near the winding shaft, wherein each of the guide blocks includes:
        a first guide wall deviating distally relative to the longitudinal direction from a position of the respective side edge of the shading sheet when the shading sheet is folded, toward a position of a fold of the shading sheet, and
        a second guide wall deviating in a deviation direction, wherein the deviation direction extends toward the shading sheet, relative to a direction orthogonal to an unrolled portion of the shading sheet, and distally relative to the longitudinal direction, wherein the second guide wall is configured to abut the respective side edge of the shading sheet while the side edge is being unfolded, the second guide wall having an abuttable surface that is configured to be abutted on the respective side edge of the shading sheet and arranged to be parallel to the unrolled portion of the shading sheet.

2. The shade apparatus according to claim 1, further comprising a holding member that comes into contact with or comes close to the unrolled portion of the shading sheet, the holding member and the second guide wall of each of the guide blocks being positioned on opposite sides of the shading sheet along the direction orthogonal to the unrolled portion of the shading sheet.

3. The shade apparatus according to claim 2,
    wherein the direction orthogonal to the unrolled portion of the shading sheet coincides with a height direction of the vehicle,
    wherein the holding member is provided below the shading sheet in the height direction, and extends over an entire length between both guide blocks.

4. The shade apparatus according to claim 3,
    wherein the holding member is configured to direct the shading sheet in the longitudinal direction when the shading sheet is being unwound, and is further configured to guide each side edge of the shading sheet into the corresponding guide block.

5. The shade apparatus according to claim 2,
wherein the holding member is disposed at a distal end of each of the guide blocks, in proximity to the winding shaft.

6. The shade apparatus according to claim 1,
wherein the second guide wall has a through hole configured to release the corresponding side edge of the shading sheet, wherein the first guide wall is configured to raise the side edge when the shading sheet is being wound.

7. The shade apparatus according to claim 1,
wherein each guide block additionally includes a guide vertical wall, each guide vertical wall deviating distally relative to the longitudinal direction from a position of the fold of the shading sheet toward a position of the side edge of the shading sheet when the shading sheet is unfolded.

8. The shade apparatus according to claim 1,
wherein the guide blocks open the folded side edges of the shading sheet 180 degrees.

9. The shade apparatus according to claim 1,
wherein rigidity of the folded side edges of the shading sheet is greater than rigidity of a portion of the shading sheet other than the side edges.

\* \* \* \* \*